United States Patent [19]

Coburn, Jr.

[11] 4,386,123

[45] May 31, 1983

[54] ARTICLE OF MANUFACTURE AND METHODS OF MANUFACTURING

[76] Inventor: Joseph W. Coburn, Jr., 675 Ocean Ave., Long Branch, N.J. 07740

[21] Appl. No.: 305,997

[22] Filed: Sep. 28, 1981

[51] Int. Cl.[3] ........................ B44F 1/10; B29D 11/00; B29C 9/00; B44C 1/26

[52] U.S. Cl. ........................................ 428/29; 428/30; 428/40; 428/67; 264/1.7; 264/1.9; 264/2.4; 264/2.7; 264/246; 264/247; 264/268

[58] Field of Search ........................ 428/40, 67, 29, 30; 264/1.4, 1.6, 1.7, 1.9, 2.4, 2.7, 246, 247, 268, 132

[56] References Cited

U.S. PATENT DOCUMENTS

| | | | |
|---|---|---|---|
| 2,823,422 | 2/1958 | Schneider | 264/268 |
| 4,087,570 | 5/1978 | Beinbrech | 264/1.7 |
| 4,100,010 | 7/1978 | Waugh | 264/1.7 |
| 4,139,654 | 2/1979 | Reed | 264/1.7 |
| 4,263,734 | 4/1981 | Bradshaw | 428/67 |
| 4,332,074 | 6/1982 | Auld et al. | 264/132 |

*Primary Examiner*—William R. Dixon, Jr.

*Attorney, Agent, or Firm*—R. Gale Rhodes, Jr.

[57] ABSTRACT

An article of manufacture, including a substrate provided on its top surface with an integrally formed, raised, peripheral edge providing at least a portion of a mold; and a body of substantially transparent composition received within said mold and adhered to the substrate, the composition formed into a dome shape to provide a magnifying lens effect to the top surface. A method of manufacturing an article of manufacture, including the steps of: providing a substrate on its top surface with an integrally formed, raised, peripheral edge providing at least a portion of a mold; depositing an amount of substantially transparent composition in substantially liquid form into the mold and allowing the composition to flow outwardly to the peripheral edge to form a positive meniscus; and curing the composition to harden the composition into a dome shape to provide a magnifying lens effect to the top surface.

11 Claims, 8 Drawing Figures

ARTICLE OF MANUFACTURE AND METHODS OF MANUFACTURING

BACKGROUND OF THE INVENTION

1. Field of the Invention

This invention relates generally to an article of manufacture, and more particularly to a decorative article of manufacture, e.g., a medallion, emblem, decal, sticker, etc.; and to methods of manufacturing such articles.

Typical decorative articles of manufacture and manufacturing methods therefor to which this invention is related are those disclosed or referred to in U.S. Pat. Nos. 4,087,570; 4,100,010 and 4,139,654.

A typical decorative article of manufacture consists of a substrate upon which indicia, such as a decorative design, letters or a trademark, are printed or painted and upon which a transparent cap in the form of a convex dome is bonded to provide a magnifying lens effect. Articles of this type may be attached to the variety of products to provide a visually attractive identification of the product or its manufacturer or to convey information about the product's operation; the articles are also used as an end product or decorative device, per se. The indicia may include an emblem, trademark, artistic design and names. With suitable indicia and artistic designs such articles are also used as jewelry, key rings and for the decorative enhancement of other products.

Typically, the substrate is a metal disc or body of plastic material such as vinyl or polyester, the indicia is formed by printing, stamping or painting, and the cap is a body of cast polyurethane.

Still, more specifically, the present invention is an improvement over the prior art method of making a decorative article of manufacture or emblem disclosed in U.S. Pat. No. 4,100,010 and the article made thereby. In such prior art method of manufacture a flat foil shape, e.g., metal disc, is provided having sharply defined peripheral sides which intersect with the top surface, the foil shape is supported on a surface free from surrounding side walls (i.e., no mold or cavity is provided to receive the cast liquid cap material, e.g., polyurethane) and a measured amount of plastic composition such as a polyurethane in liquid form is cast on the top surface of the foil shape and forms a positive meniscus, the plastic composition is cured to give a magnifying lens effect to the top surface. Since no mold or cavity is provided to receive the liquid plastic composition, the flat foil shape being supported on a surface free from side walls to obtain a meniscus contiguous of the peripheral sides requires use of a precisely controlled amount of plastic sufficient to flow out to the sides without overflowing them. This method requires careful control of the amount of cast plastic and the shape of the foil sides. Since the decorative article must be relatively free from defects for sale, the requirement of precisely controlling the amount of liquid plastic cast and the requirement of sharply defining the foil sides add undesired cost to the method of manufacture and hence to the decorative article itself.

Accordingly, it is the general object of the present invention to provide an improved article of manufacture and an improved method of manufacturing such article.

It is the further object of the present invention to provide an improved method of manufacturing a decorative article of manufacture where the amount of liquid plastic cast requires less precise control than the prior art and the shape of the peripheral sides of the substrate requires less control or definition; and to provide a new and useful decorative article of manufacture which may be made by such method of manufacture.

SUMMARY OF THE INVENTION

An article of manufacture, particularly a decorative article of manufacture, embodying the present invention may include a substrate provided on its top surface with an integrally formed, raised, continuous, peripheral edge providing a mold, or in another embodiment, provided with a pair of integrally formed, opposed, raised, peripheral edges providing a portion of a mold, wherein the mold is for receiving an amount of substantially transparent composition in substantially liquid form which flows outwardly to the raised peripheral edge(s) and forms a positive meniscus; the composition upon curing hardens and forms a convex dome or cap which provides a magnifying lens effect to the top surface of the substrate which top surface may be provided with suitable indicia of the type described above.

In a further embodiment of the present invention, the bottom surface of the substrate may be suitably embossed to form it into a predetermined design, such as a diffraction grating, and the bottom surface may then be suitably metallized to provide a reflective coating; a coating of pressure sensitive adhesive material and a covering layer of release material may then be provided over the reflective coating whereby the article, upon removal of the layer of release material, may be suitably secured or attached to an object such as a product or other surface.

The present invention also includes method embodiments of manufacturing such articles, for example, in a more specific method of manufacture embodying the present invention and providing an improvement over the above-mentioned U.S. Pat. No. 4,100,010, a substrate of suitable thermoplastic material, such as a polyvinylchloride, polycarbonate or acrylic, was cut into a predetermined shape by a chisel or bevel-edged thermal die to cause a portion of the thermoplastic material adjacent the cut to flow generally upwardly and inwardly to form on the top surface of the substrate a raised peripheral edge of thermoplastic material producing a mold or cavity for receiving an amount of substantially clear and substantially liquid plastic composition, such as substantially clear and liquid polyurethane. The composition was cast into the mold or cavity and flowed outwardly to the raised peripheral edge, and due to surface tension, formed a positive meniscus. The plastic composition was cured, such as by radiation with UV light, or is allowed to cure, to give a magnifying lens effect to the top surface of the substrate. Prior to casting the plastic composition, and preferably also prior to the thermal die-cutting, the top surface of the thermoplastic material to underlie the plastic composition may be provided with suitable indicia of the type described above. The thermoplastic material may be transparent, or of a suitable color also suitably transparent, with the bottom surface underlying the plastic composition suitably molded or embossed to provide a predetermined design such as a textured design such as a diffraction grating; the embossed surface is suitably metallized, such as by vacuum deposition of aluminum, whereby light passing through the cured plastic composition and the thermoplastic material strikes the metallized embossed bottom surface and is reflected back upwardly through the thermoplastic material and plastic composition to provide a visual effect determined substantially by the molded or embossed design, and the color of the plastic material if colored. The metallized bottom surface may be further provided with a coating of pressure sensitive adhesive material and a layer or covering of release material in the manner known to those skilled in the art whereby the decorative article may be suitably secured or attached to an object such as a product or other surface.

DESCRIPTION OF THE PREFERRED EMBODIMENTS

Figure 1:
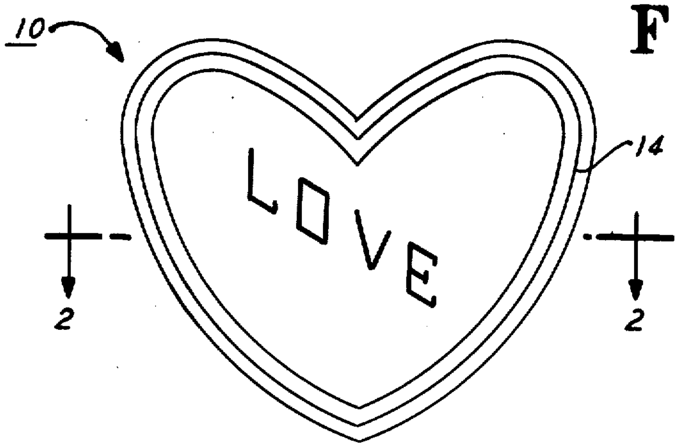
FIG. 1 is a plan view of an article of manufacture embodying the present invention.

Referring now to FIG. 1, there is shown in plan view an article of manufacture, particularly a decorative article of manufacture, embodying the present invention and indicated generally by numerical designation 10. As may be seen more clearly in FIG. 2, the article 10 may include a substrate indicated by general numerical designation 12 and a body of substantially transparent composition indicated by general numerical designation 20. The substrate 12 may include a layer of suitable substantially transparent plastic material 13 whose bottom surface may be provided with or formed into a design indicated by irregular or saw-tooth line 22 and a coating of reflective material 24 covering the design 22; the substrate may further include a coating of pressure sensitive adhesive material 26 covering the coating of reflective material 24, and a layer of release material 28 covering the coating of pressure sensitive adhesive material 26. The layer of substantially transparent plastic material 13 is provided with an integrally formed, raised, continuous, peripheral edge 14 providing a cavity or mold 16 and the body of substantially transparent composition 20 is received within the mold 16 and adhered to the layer of plastic material 13. The substantially transparent composition 20 is formed into a dome shape to provide a magnifying lens effect to the top surface of the layer of plastic material 13 which top surface, as may be noted in FIG. 1, may be provided with suitable indicia such as the word "LOVE" stamped thereon by a suitable hot stamping foil.

The design 22 may be provided on the bottom surface of the layer of plastic material 13 by embossing, such as with a suitably complementarily embossed roller or a suitably complementarily embossed stamping die, which provides the bottom surface of the layer of plastic material 13 with a surface relief providing the design 22 which design may be, for example, a textured or surface relief design such as a diffraction grating, e.g. a spiral diffraction grating or a mosaic of spiral diffraction gratings such as known to those skilled in the art.

The coating of reflective material 24 may be provided by suitable vacuum deposition of aluminum, or an aluminum alloy, and may be provided by suitable commercially available vacuum deposition apparatus. Similarly, the coating of pressure sensitive adhesive material 26 and the layer of release material 28 may be applied or provided by suitable commercially available apparatus.

Upon removal of the layer of release material 28, the coating of pressue sensitive adhesive material 26 may be used for adhering the article 10 to an object or surface as described hereinabove.

Figure 2:
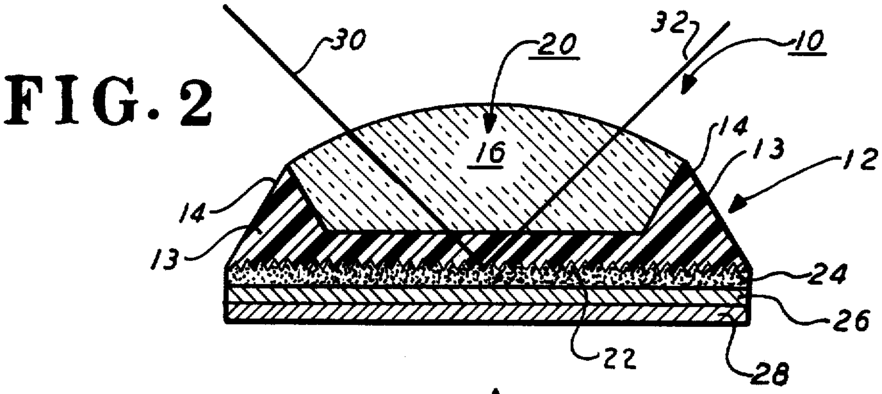
FIG. 2 is a cross-sectional view of the embodiment of FIG. 1 taken substantially along the line 2—2 in the direction of the arrows.

Light, indicated by arrows 30 and 32 in FIG. 2, upon being transmitted through the body of substantially transparent composition 20 and the layer of substantially transparent plastic material 13 and striking the reflective coating 22, is reflected back through the plastic material 13 and the body of plastic composition 20 to provide a visual effect determined substantially by the design 22. Of course, if indicia is provided on the upper surface of the layer of plastic material 13, the indicia cooperates with the design 22 to determine the visual effect. Still further, as will be understood by those skilled in the art, the layer of substantially transparent plastic material 13 may be suitably colored by a suitable dye or color pigment and concentration of dye or color pigment controlled such that the colored plastic material remains substantially transparent; if the plastic material 13 is so colored, it will be further understood that the color of the plastic further cooperates with the design and indicia or design to determine the visual effect.

Figure 3:
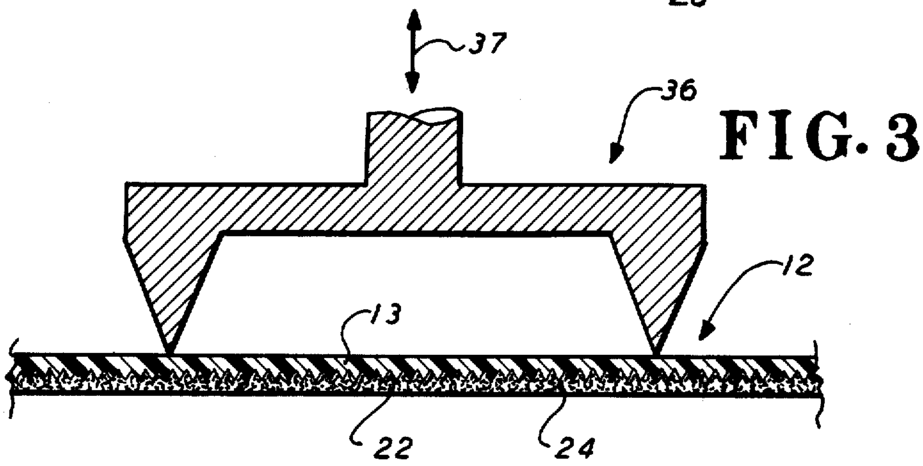
FIGS. 3, 4, 5 and 6 are diagrammatic cross-sectional views illustrating various methods of manufacturing articles according to the invention.
Figure 4:
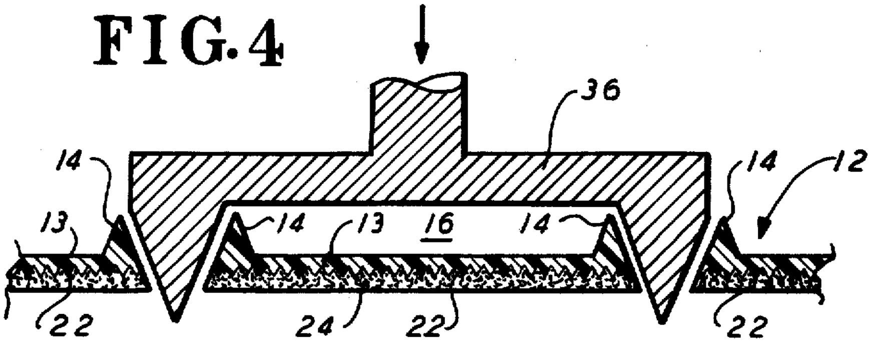

Referring now to a method of manufacturing embodying the present invention, reference is made to FIGS. 3 and 4 wherein, it will be understood, that in this embodiment the layer of substantially transparent plastic material 13 is a layer of suitable thermoplastic material such as a suitable polyvinyl chloride, polycarbonate or acrylic. The substrate 12 is suitably supported (by means not shown) beneath a suitable bevel-edged thermal die indicated diagrammatically and identified by general numerical designation 36, which thermal die is suitably supported for reciprocating movement as indicated by the arrow 37 in FIG. 3. As shown in FIG. 4, the bevel-edged thermal die 36 is advanced into engagement with and through the layer of thermoplastic material 13 and the reflective coating 24 to form the substrate 12 into a predetermined shape, such as the heart shape illustrated in plan view in FIG. 1; of course, it will be understood by those skilled in the art that in such event the bevel-edged thermal die 36 will be suitably formed into a heart shape. Upon the bevel-edged thermal die 36 engaging and passing through the layer of thermoplastic material 13, peripheral portions of the thermoplastic material (that is, portions adjacent or contiguous to the outer edge or outline of the shape provided to the layer of thermoplastic material 13 by the bevel-edged thermal die 36) will be heated and due to the bevel-edged shape of the thermal die 36 and the viscoelastic properties of the thermoplastic material, such heated peripheral portions will be caused to flow upwardly and inwardly and form the integrally formed, raised, continuous peripheral edge 14 providing the cavity or mold 16 for receiving the plastic composition 20.

It will be further understood by those skilled in the art that the bevel-edged thermal die 36 may be of other closed shapes or configurations, such as a circle, rectangle, oval, star, etc., and such shaped thermal die will provide the thermoplastic material with such other configurations and with an integrally formed, raised, continuous, peripheral edge of the same configuration.

Subsequent to the manufacturing method illustrated in FIGS. 3 and 4, a body of substantially transparent and substantially liquid composition, such as a suitable polyurethane or polyurethane compound or composition, may be suitably cast or deposited into the mold 16 and allowed to flow outwardly to the integrally formed, raised, continuous, peripheral edge 14 (FIG. 2) to form a positive meniscus; the composition 20 as known to those skilled in the art, upon hardening will adhere to the layer of plastic material 13. The composition 20 may be cured to harden the composition into a dome shape to provide a magnifying lens effect to the top surface of the layer of plastic material 13 by allowing the composition to cure naturally or normally under ambient conditions or by being cured by radiation such as UV irradiation.

It will be understood by those skilled in the art, and referring to FIG. 4, that the spacing shown between the bevel-edged thermal die 36 and the substrate 12 is exaggerated for convenience of presentation and clarity of understanding.

Figure 6:
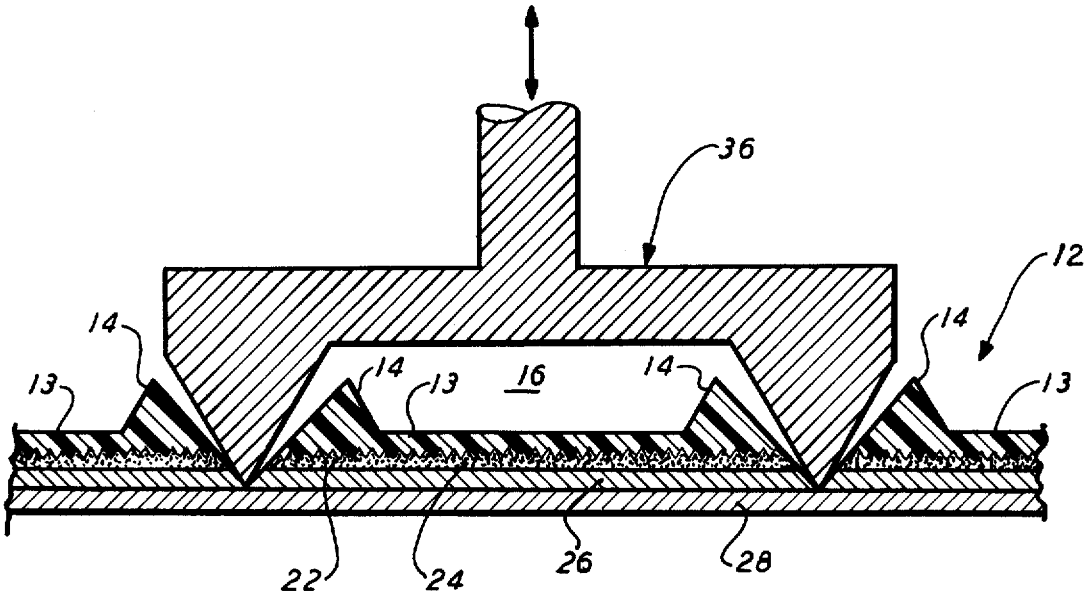

An alternate method of manufacturing embodying the present invention is illustrated diagrammatically in FIG. 6 wherein, it will be understood, the layer of plastic material 13 need not necessarily be a layer of thermoplastic material but may be any suitable plastic material, including thermoplastic material, which, upon the application of suitable pressure or suitable pressure and heat, will deform or flow to provide the integrally formed, raised, continuous, peripheral edge 14 providing the mold 16. In this embodiment, the substrate 12 is interposed between complementarily shaped male and female dies 62 and 64, respectively, and, upon relative motion being produced between the dies, the dies engage the substrate 12 to provide it with a predetermined shape, such as the predetermined shape of the complementarily shaped male and female dies 62 and 64 which may be for example heart-shaped, and to cause peripheral portions of a layer of plastic material 13 to flow upwardly and inwardly and form the integrally formed, raised, continuous, peripheral edge 14 as shown. Depending upon the specific plastic material utilized, and the height of the peripheral edge 14 desired, the male and female dies 62 and 64 may be suitably heated such that both pressure and heat are applied to the substrate 12. It will be further understood by those skilled in the art that the spacing shown between the male and female dies 62 and 64 and the substrate 12 is exaggerated for convenience of presentation and clarity of understanding.

Figure 5:
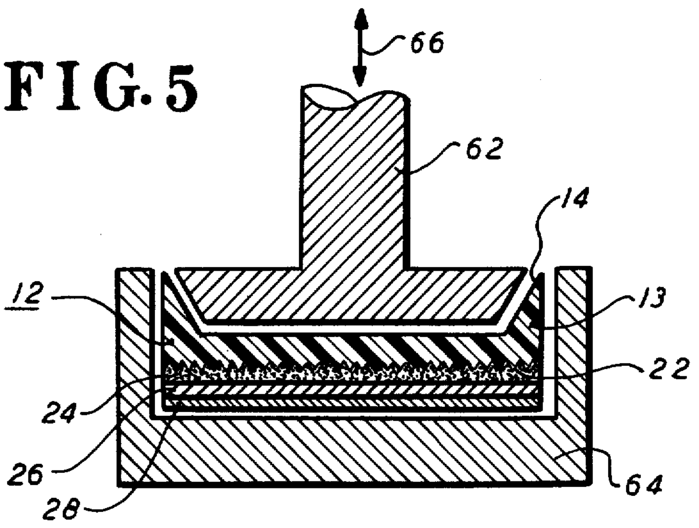

Instead of being formed as a discrete article of manufacture as illustrated in FIGS. 4 and 5, the article of manufacture, particularly decorative article of manufacture, embodying the present invention may be formed as a plurality or strip or string of articles of manufacture formed on a continuous backing or continuous layer of material such as a continuous layer or strip of release paper such as release paper 28 of FIGS. 2–4. This method of manufacturing is illustrated in FIGS. 6 and 7 where a continous sheet or strip of substrate 12 (e.g. substrate 12 of FIG. 2) is advanced continuously (i.e. intermittently with periodic stops at various work stations but still continuously in the general manufacturing sense) by suitable commercially available advancing machinery (not shown) but well known to those skilled in the art.

Figure 7:
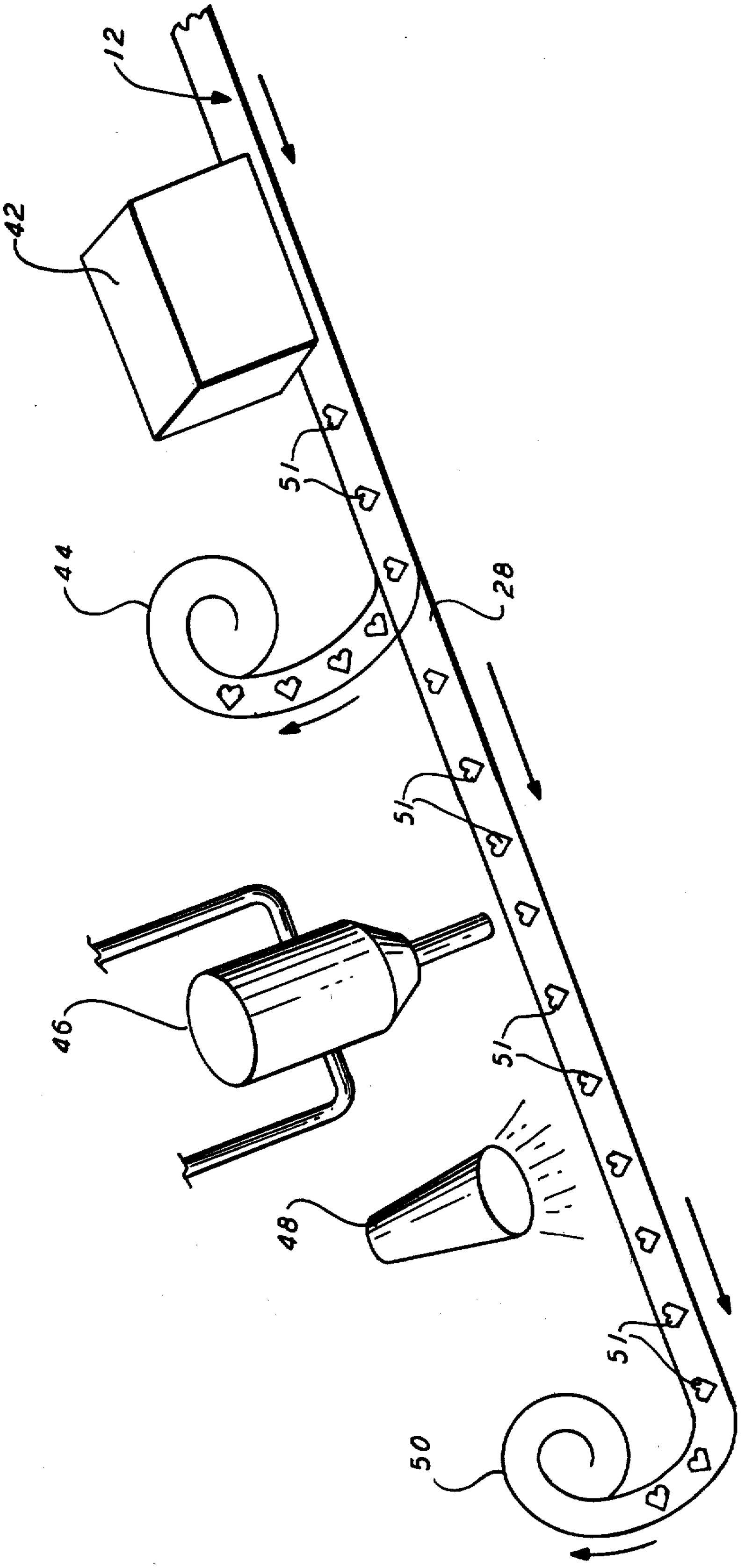
FIG. 7 is a diagrammatic illustration illustrating the sequence of a method of manufacturing embodying the present invention.

Referring particularly to FIG. 7, it will be understood that the method of manufacturing may utilize a thermal die cutting station 42, first material handling or rolling station 44, a polyurethane composition deposition station 46, a UV irradiation station 48 and a second material handling or rolling station 50.

The thermal die cutting station 42 is illustrated in greater detail, although diagrammatically, in FIG. 6 wherein a bevel-edged thermal die which may be, for example, the heart-shaped bevel-edged thermal die 36 of FIGS. 3 and 4 which, unlike as illustrated in FIG. 4, is not advanced through the entire substance 12 but instead is advanced at least into engagement with and through the layer of thermoplastic material 13 and the reflective coating 24, and preferably only into but not through the layer of pressure sensitive adhesive material 26 and preferably not advanced into the layer of release material 28. To facilitate removal of the article from the layer of release material, preferably, the length of the downward stroke of the bevel-edged thermal dic 36 is controlled such that the beveled edge penetrates the substrate downwardly only to the top surface of the layer of release material 28; however, penetration of the thermal die into the layer of release material is not ruinous but merely results in an increase in difficulty in removing the article from the layer of release material.

Referring again to FIG. 7, and after the thermal die cutting as illustrated in FIG. 6, the substrate 12 is then advanced past the first work handling or rolling station 44 where the layer of thermoplastic material 13, reflective coating 22 and pressure sensitive adhesive coating 24 surrounding the heart-shaped articles 51 provided or formed by the inner portion of the thermal die 36, is suitably stripped away from the heart-shaped articles 51 and the continuous strip of release material 28 by commercially available machinery known to those skilled in the art; the stripped material may be suitably accumulated on a roll as illustrated diagrammatically at station 44. The continuous strip of release material 28 having the plurality of heart-shaped articles 51 of manufacture residing thereon, as illustrated in FIG. 7, is then advanced to the polyurethane deposition station 46 where the strip of release paper 28 is intermittently halted to permit an amount of polyurethane composition to be deposited into the mold 16 (FIG. 6) of each article 51 to provide the dome of substantially transparent composition 20 (FIG. 2), whereafter the strip of release material 28 is advanced to the irradiation station 48 where it is intermittently halted to provide the curing of the deposited plastic composition 20 by irradiation, such as UV irradiation, whereafter the strip of release material having a plurality of articles 51 of manufacture formed thereon may be further advanced to the second work or material handling station 50 where the strip of release material 28 having the now completed heart-shaped articles of manufacture 51 provided thereon may be accumulated on a suitable roll for subsequent processing, such as being cut into smaller lengths or rolls or to be cut into short lengths for sale. It will be understood by those skilled in the art that the intermittent advancement rate of the substrate 12 and layer of release material 28, and the period of time required to perform the manufacturing operation at each work station, may be suitably timed to provide a continuous, although intermittent, manufacturing operation.

Figure 8:
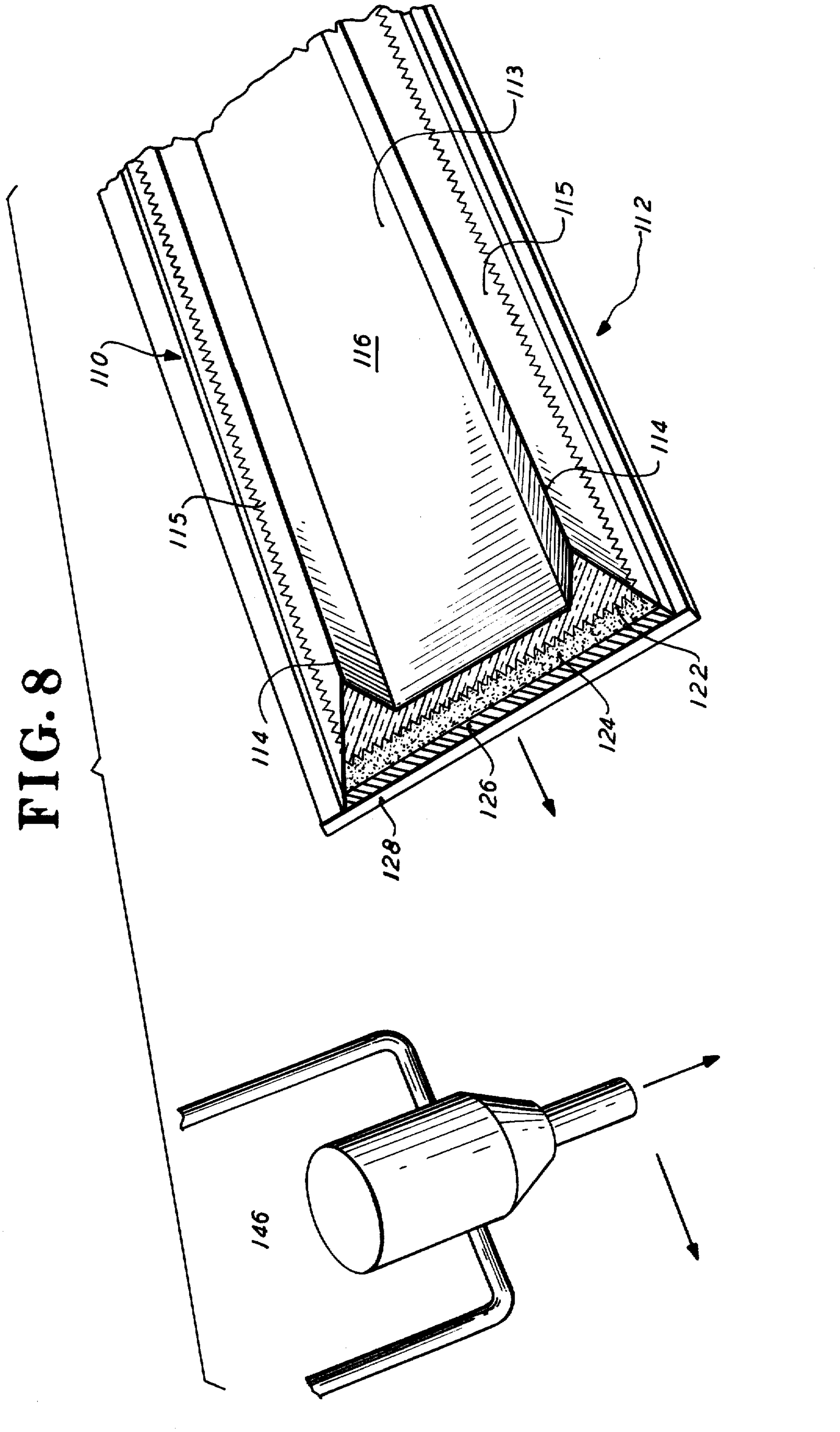
FIG. 8 is another diagrammatic illustration showing a sequence of another method of manufacturing embodying the present invention.

In FIG. 8, there are illustrated both an additional article of manufacture 110 embodying the present invention and a method of manufacturing such article. A generally longitudinally extending strip of substrate 112 which may be substantially the same as, or identical to the substrate 12 of FIG. 2 and may include a layer of substantially transparent plastic material 113 provided on its bottom surface with a design 122, a coating of reflective material 124, a coating of pressure sensitive adhesive material 126 and a layer of pressure release material 128.

The layer of plastic material 113 is provided with generally opposed longitudinally extending side edges 115—115 and is provided on its top surface with integrally formed, opposed, raised, peripheral edges 114—114 formed substantially coincident with the generally opposed longitudinally extending side edges 113—113 and providing a portion of a mold 116.

It will be understood that wherein the layer of substantially transparent plastic material 113 is a suitable thermoplastic material, the material 113 may be provided with its generally longitudinally extending shape and generally opposed, longitudinally extending side edges 113—113 by being engaged by a suitably shaped bevel-edged thermal die which engages the layer of plastic material and is advanced therethrough to provide the plastic material with the generally longitudinally extending shape or configuration and the generally opposed, longitudinally extending side edges 115—115; additionally, the thermal die engages peripheral portions of the plastic material 113 adjacent the longitudinally extending side edges 115—115 and heats such peripheral portions and causes them to flow upwardly and inwardly and form the opposed, raised, peripheral edges 114—114. However, it will be understood that in this embodiment, the bevel-edged thermal die instead of being of a closed configuration, such as heart-shaped as described above, will be comprised of a pair of parallel, longitudinally extending, bevel-edged thermal dies which, in cross-section, will have the same or substantially the same cross-sectional configuration as the thermal die 36 of FIGS. 3, 4 and 6.

Alternatively, as described above in connection with the embodiment illustrated in FIG. 5, the layer of plastic material 113 of the substrate 112 need not necessarily be a thermoplastic material and, as before, may be any suitable plastic material which, in response to suitable pressure or suitable pressure and heat, will be shaped as illustrated in FIG. 8 and provided with the integrally formed, opposed, raised peripheral edges 114. In this embodiment, opposed male and female dies 62 and 64 of the type shown in FIG. 5 may be used, but, instead of being closed dies such as the above-described heart-shaped dies, the male and female dies 62 and 64 would be longitudinally extending dies but would have the same cross-section as the dies illustrated in FIG. 5. In this process, as well as in the process using the bevel-edged thermal dies described in connection with the embodiment of FIG. 8, the forming process would be the step and repeat process of the type well known to those skilled in the art.

Referring again particularly to FIG. 8, it will be presumed that the layer of substantially transparent plastic material 113 has been provided with the shape or configuration described above and as illustrated diagrammatically in FIG. 8 and that the substrate 112 will be advanced continuously by suitable commercially available advancing apparatus known to those skilled in the art (not shown) past a composition deposition station 146 where substantially transparent composition, such as the polyurethane composition described above, in substantially liquid form is cast or deposited into the mold 116 and flows laterally outwardly to the integrally formed, raised, peripheral edges 114 and forms a positive meniscus as viewed in transverse cross-section. Upon hardening in the mold 116, the deposited composition and substrate 112, and hence the article of manufacture 110, will have the same or substantially the same transverse cross-sectional configuration as the article of manufacture 10 illustrated in FIG. 2; further, as known to those skilled in the art, upon hardening, the deposited composition will adhere to the top surface of the layer of plastic material 113.

Referring again to the method of manufacture illustrated in FIG. 8, it will, of course, be understood that upon the composition being initially cast or deposited into the mold 116, and being in substantially liquid form, the composition will flow in all directions but as the substrate is advanced continuously past the deposition station 116, the initially cast or deposited composition will begin to harden, naturally or normally under ambient conditions or in response to radiation such as UV radiation which may be provided by a radiation station (not shown) but which may be provided downstream of the deposition station 116, and, upon such composition hardening in response to such curing, or beginning to so harden, an effective dam will be provided at the front end of the mold 116 to assist the peripheral edges 114—114 in providing a mold or confining the deposited composition; and, upon the rearward or end portion of the layer of plastic material 113 passing the deposition station 146, the deposition station will discontinue its deposition operation and as the rearward portion of the cast deposition begins to harden, cure or be cured as described above, a dam will be provided at the rearward portion of the mold 116 and the cast or deposited composition will be fully contained. Of course, as understood by those skilled in the art, upon the cast or deposited composition hardening by being cured within the mold 116, the front and rearward edges of the article 110 will be trimmed to provide a well defined article of manufacture of generally longitudinally extending configuration.

It will be understood by those skilled in the art that in the context of the present specification and the appended claims the terms acrylic, silicone and polyurethane are used in the sense of their typical or general meaning to include the various compositions and compounds thereof; for example, the term polyurethane is used to include the various compositions and compounds thereof such as disclosed in or referred to in U.S. Pat. No. 4,100,010. Thus, it will be understood that the specific composition comprising the dome-shaped body 20 providing the magnifying lens effect is not critical to the present invention but what is critical is that the composition be substantially transparent, be initially substantially liquid such that it flows to the peripheral edge(s) and forms a positive meniscus, be sufficiently wettable to the substrate to cause the composition to adhere thereto upon hardening, and that it be curable either naturally or normally under ambient conditions or in response to further treatment such as by UV irridation.

In a specific embodiment of the present invention, a rigid polyvinyl chloride compound, such as Dacovin or Geon commercially available from Diamond Shamrock Corp. or B. F. Goodrich was colored with a dye or transparent pigment, such as an anthraquinone or phthalocyanine commercially available from American Hoechst or BASF and then extended into a 0.003 inch±0.0003 inch film which had a diffraction grating design molded or embossed into one surface with the opposite surface remaining smooth. As known to those skilled in the art, the color of the dye or transparent pigment in concentration thereof was chosen such that the resulting extruded plastic film although colored was also substantially transparent. The diffraction grating design molded into one surface was done by embossing the surface to form the surface into a surface relief providing the design; this may be done, for example, by a suitably complementarily embossed roller or by a suitably complementarily embossed stamping or embossing die. The embossed surface of the extruded plastic film was then vacuum metallized with aluminum to a thickness of 0.0001 inch or 2–3 ohms/in.$^2$ and then the metallized surface was coated with a hot melt pressure sensitive adhesive, such as HM1500 commercially available from H. B. Fuller Company to a thickness of from 0.001 inch ±0.0002 inch. Then, the pressure sensitive adhesive material was covered with a layer of release paper, such as H. P. Smith 8024 commercially available from H. P. Smith. The plastic film extruder may be any one of several commercially available extruders and the vacuum metallizing equipment may be any one of several commercially available such equipments. Similarly, the machine for applying the pressure sensitive adhesive material may be any one of several commercially available machines and the machine for applying the release paper may be also any one of several commercially available machines. A photoetched magnesium die, such as commercially available was then used to thermally stamp "LOVE" on the smooth or unembossed surface of the extruded polyvinyl chloride film using commercially available hot stamping foils at a temperature of 130° C.±20° C. with a dwell time of 0.75 sec.±0.25 sec. and at a pressure 30±10 psi. A commercially available bevel-edged thermal die was then used to thermally cut the substrate into a heart shape at a temperature of 107° C.±10° C. with a dwell time of 0.75 sec.±0.25 sec. also simultaneously providing the integrally formed, raised, continuous, peripheral edge referred to above, which peripheral edge, as also described above, provided a mold. It will be further understood by those skilled in the art that the height of the peripheral edge can be suitably controlled by varying the dwell time and/or the temperature of the thermal die. A clear polyurethane composition was then cast onto the mold provided by the peripheral edge and the polyurethane flowed outwardly to the peripheral edge, and due to its surface tension, formed a positive meniscus which, upon the polyurethane hardening under ambient conditions, hardened into a dome-shaped cap providing a magnifying effect to the substrate and the indicia "LOVE" stamped thereon.

It has been found that the use of the bevel-edged thermal die to produce the raised peripheral edge(s) provides, at least as compared to a steel rule die, a comparatively rough or ragged edge which has been found to enhance or increase the height of the positive meniscus of the cast composition which, it is believed, does not wet to the comparatively rough or ragged raised peripheral edge and hence tends to form a higher meniscus than would be formed were the bounding edge of the article to be an extremely clean and well defined edge such as produced by a steel rule die.

It will be understood by those skilled in the art that many modifications and variations of the present invention may be made without departing from the spirit and the scope thereof.

What is claimed is:

1. An article of manufacture, comprising:

a layer of substantially transparent predetermined plastic material having a top surface and a bottom surface;

a predetermined design formed into said bottom surface;

a coating of predetermined reflective material covering said predetermined design;

said layer of predetermined plastic material and said coating of predetermined reflective material formed into a predetermined shape and said substrate provided on its top surface with an integrally formed, raised, continuous, peripheral edge providing a mold;

a body of substantially transparent predetermined composition residing within said mold and adhered to said substrate, said composition formed into a dome shape to provide a magnifying lens effect to said top surface; and upon light being transmitted through said body of substantially transparent predetermined composition and said substrate of substantially transparent predetermined plastic material and striking said reflective coating, said light being reflected back through said plastic material and said body to provide a visual effect determined substantially by said predetermined design.

2. An article of manufacture, comprising:

a layer of generally longitudinally extending substantially transparent predetermined plastic material having generally opposed longitudinally extending side edges, a top surface and a bottom surface;

said layer of predetermined plastic material provided on its top surface with integrally formed, opposed, raised, peripheral edges formed substantially coincident with said generally opposed longitudinally extending side edges and providing a portion of a mold;

a predetermined design formed into said bottom surface;

a coating of predetermined reflective material covering said predetermined design;

a body of substantially transparent composition received within said mold in substantially liquid form and having flowed laterally outwardly to said raised peripheral edges to form a positive meniscus, said composition being adhered to said substrate and being cured and hardened into a dome shape in transverse cross-section to provide a magnifying lens effect to said top surface; and upon light being transmitted through said body of substantially transparent composition and said layer of substantially transparent predetermined plastic material and striking said reflective coating, said light reflected back through said plastic material and said body to provide a visual effect determined substantially by said predetermined design.

3. An article of manufacture according to claims 1 or 2 wherein said substantially transparent predetermined plastic material is colored plastic material and wherein said color cooperates with said predetermined design to determine said visual effect.

4. An article of manufacture according to claims 1 or 2 further including a coating of pressure sensitive adhesive material covering said predetermined design and said bottom surface and a layer of release material covering said coating of pressure sensitive adhesive material and, upon removal of said layer of release material, said coating of pressure sensitive adhesive material adhering said article of manufacture to an object.

5. A method of manufacturing an article of manufacture, comprising the steps of:

providing a layer of substantially transparent predetermined plastic material having a top surface and a bottom surface;

forming said bottom surface into a predetermined design;

coating said bottom surface formed into said predetermined design with a coating of predetermined reflective material;

coating said coating of reflective material with a coating of pressure sensitive adhesive material;

covering said coating of pressure sensitive adhesive material with a layer of release material;

providing at least said layer of plastic material and said coating of reflective material with a predetermined shape and simultaneously providing said top surface of said layer of plastic material with an integrally formed, raised, continuous, peripheral edge providing a mold;

depositing an amount of substantially transparent predetermined polyurethane in substantially liquid form into said mold which polyurethane flows outwardly to said raised peripheral edge and forms a positive meniscus; and curing said polyurethane to harden said polyurethane into a dome shape to provide a magnifying lens effect to said top surface.

6. A method of manufacturing according to claim 5 wherein said layer of plastic material is a predetermined thermoplastic material and wherein said step of providing at least said layer of plastic material and said coating of reflective material with a predetermined shape and simultaneously providing said top surface of said layer of plastic material with an integrally formed, raised, continuous, peripheral edge is accomplished by the step of advancing a beveled-edge, heated thermal die into engagement with and through said layer of plastic material and said coating of reflective material to provide said layer of plastic material and said coating of reflective material with said predetermined shape and to heat peripheral portions of said layer of plastic material and cause said heated peripheral portions thereof to flow upwardly and inwardly and form said peripheral edge.

7. A method of manufacturing according to claim 5 wherein said step of providing at least said layer of plastic material and said coating of reflective material with a predetermined shape and simultaneously providing said top surface of said layer of plastic material with an integrally formed, raised, continuous, peripheral edge is accomplished by the step of interposing said layer of plastic material between male and female dies of respective predetermined shapes and producing relative motion therebetween to cause said dies to engage said layer of plastic material and said coating of reflective material to provide said layer of plastic material and said coating of reflective material with said predetermined shape and to cause peripheral portions of said layer of plastic material to flow upwardly and inwardly and form said peripheral edge.

8. A method of manufacturing an article of manufacture, comprising the steps of:

providing a layer of substantially transparent predetermined plastic material having a top surface and a bottom surface;

forming said bottom surface into a predetermined design;

coating said bottom surface formed into said predetermined design with a coating of predetermined reflective material;

coating said coating of reflective material with a coating of pressure sensitive adhesive material;

covering said coating of pressure sensitive adhesive material with a layer of release material;

providing at least said layer of plastic material and said coating of reflective material with a predetermined shape including generally opposed longitudinally extending side edges and simultaneously providing said top surface of said layer of plastic material with integrally formed, opposed, raised, peripheral edges formed substantially coincident with said generally opposed longitudinally extending side edges to provide at least a portion of a mold;

depositing an amount of substantially transparent predetermined polyurethane in substantially liquid form into said mold which polyurethane flows laterally outwardly to said raised peripheral edges and forms a positive meniscus; and curing said polyurethane to harden said polyurethane into a dome shape to provide a magnifying lens effect to said top surface.

9. A method of manufacturing according to claim 8 wherein said layer of plastic material is a predetermined thermoplastic material and wherein said step of providing at least said layer of plastic material and said coating of reflective material with a predetermined shape including generally opposed longitudinally extending side edges and simultaneously providing said top surface of said layer of plastic material with integrally formed, opposed, raised, peripheral edges is accomplished by the step of advancing a pair of spaced apart, linear, beveled-edge, heated thermal dies into engagement with said layer of plastic material to provide said layer of plastic material with said predetermined shape and to heat peripheral portions of said layer of plastic material adjacent said generally opposed longitudinally extending side edges to cause said heated peripheral portions to flow upwardly and inwardly and form said peripheral edges.

10. A method of manufacturing according to claim 8 wherein said step of providing at least said layer of plastic material and said coating of reflective material with a predetermined shape including generally opposed longitudinally extending side edges and simultaneously providing said top surface of said layer of plastic material with integrally formed, opposed, raised, peripheral edges is accomplished by the step of interposing said layer of plastic material and said coating of reflective material between male and female dies of respective predetermined shapes and producing relative motion therebetween to cause said dies to engage said layer of plastic material and said coating of reflective material and provide said layer of plastic material and said coating of reflective material with said predetermined shape and to cause peripheral portions of said layer of plastic material adjacent said generally opposed longitudinally extending side edges to flow upwardly and inwardly and form said peripheral edges.

11. A method of manufacturing according to claims 5 or 8 wherein said step of forming said bottom surface into a predetermined design is accomplished by embossing said bottom surface to form said bottom surface into a surface relief providing said predetermined design.

* * * * *